United States Patent [19]
Tabata

[11] Patent Number: 6,111,658
[45] Date of Patent: Aug. 29, 2000

[54] DITHER METHOD AND PRINTING APPARATUS

[75] Inventor: Yuji Tabata, Higashiyamato, Japan

[73] Assignees: Casio Computer Co., Ltd.; Casio Electronics Manufacturing Co., Ltd., both of Tokyo, Japan

[21] Appl. No.: 08/986,808

[22] Filed: Dec. 8, 1997

[30] Foreign Application Priority Data

Dec. 12, 1996 [JP] Japan ..................................... 8-331985

[51] Int. Cl.[7] .............................. H04N 1/52; H04N 1/405
[52] U.S. Cl. ........................ 358/1.9; 358/457; 358/460; 358/535
[58] Field of Search ..................................... 358/457, 460, 358/466, 534, 535, 298, 1.9, 458, 456, 404, 444; 382/237, 270

[56] References Cited

U.S. PATENT DOCUMENTS

| | | |
|---|---|---|
| 4,974,067 | 11/1990 | Suzuki et al. . |
| 5,177,623 | 1/1993 | Hirota ..................................... 358/457 |
| 5,640,249 | 6/1997 | Rao et al. ............................... 358/457 |
| 5,642,439 | 6/1997 | Sato et al. .............................. 382/254 |
| 5,761,347 | 6/1998 | Chan et al. ............................ 382/270 |
| 5,778,159 | 7/1998 | Ito et al. ................................ 358/1.9 |
| 5,953,459 | 9/1999 | Ueda et al. ............................ 382/237 |

*Primary Examiner*—Scott Rogers
*Assistant Examiner*—Joel S. Shaughnessy
*Attorney, Agent, or Firm*—Frishauf, Holtz, Goodman, Langer & Chick, P.C.

[57] ABSTRACT

A ROM in the control circuit of a color printer stores a threshold matrix. The individual elements of the threshold matrix correspond to print dots, the number of which is X×Y and which form 1 pixel in the original image. Values t (x, y) which are integral numbers not less than 0 are assigned one to each of the individual elements in a predetermined order. Using the threshold matrix, the CPU of the control circuit creates mask patterns for representing halftones. A value of 1 is subtracted from the tone number allotted to the tone of color of a pixel in an image to be printed, and the resultant value is substituted for a variable G. When a gradation for image data representing the pixel is given as "g", the condition required for setting ON (transferring toner to print) the dot specified by the coordinates (x, y) in the pixel in the case of the gradation "g" is expressed by the following formula (6):

$$t(x, y) \leq g \times X \times Y / G \quad (6)$$

Based on the threshold matrix and the formula (6), the CPU of the control section creates mask patterns in the case where the gradation "g" takes values 0 to G-1 in sequence, and develops those mask patterns in a RAM.

18 Claims, 14 Drawing Sheets

FIG.3

THRESHOLD MATRIX t(x, y) — 22a

| 0  | 32 | 8  | 40 | 2  | 34 | 10 | 42 |
|----|----|----|----|----|----|----|----|
| 48 | 16 | 56 | 24 | 50 | 18 | 58 | 26 |
| 12 | 44 | 4  | 36 | 14 | 46 | 6  | 38 |
| 60 | 28 | 52 | 20 | 62 | 30 | 54 | 22 |
| 3  | 35 | 11 | 43 | 1  | 33 | 9  | 41 |
| 51 | 19 | 59 | 27 | 49 | 17 | 57 | 25 |
| 15 | 47 | 7  | 39 | 13 | 45 | 5  | 37 |
| 63 | 31 | 55 | 23 | 61 | 29 | 53 | 21 |

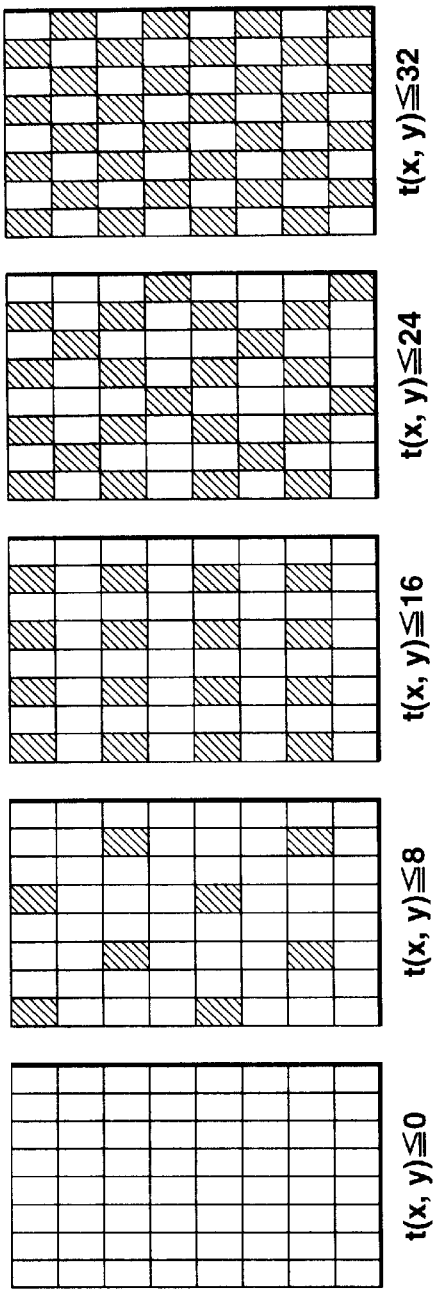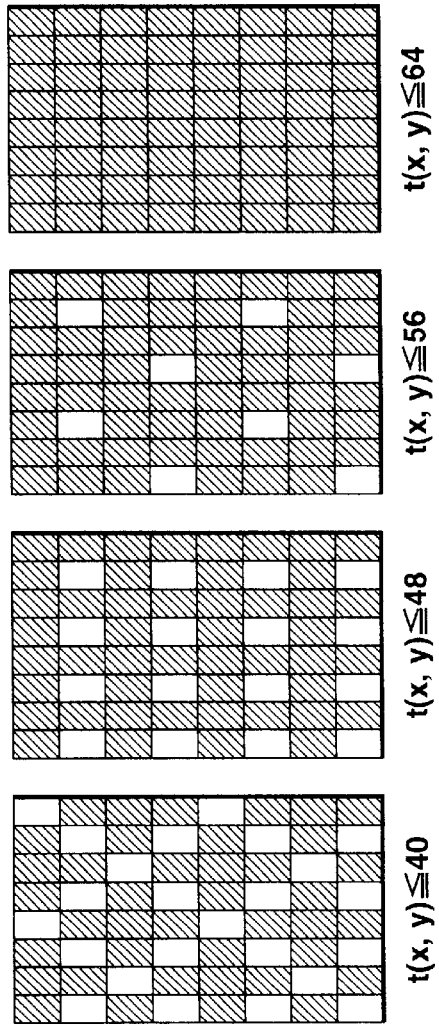

FIG.6A

BASIC PATTERN MATRIX s(x, y)

| 0 | 32 | 8 | 40 | 2 | 34 | 10 | 42 |
|---|---|---|---|---|---|---|---|
| 48 | 16 | 56 | 24 | 50 | 18 | 58 | 26 |
| 12 | 44 | 4 | 36 | 14 | 46 | 6 | 38 |
| 60 | 28 | 52 | 20 | 62 | 30 | 54 | 22 |
| 3 | 35 | 11 | 43 | 1 | 33 | 9 | 41 |
| 51 | 19 | 59 | 27 | 49 | 17 | 57 | 25 |
| 15 | 47 | 7 | 39 | 13 | 45 | 5 | 37 |
| 63 | 31 | 55 | 23 | 61 | 29 | 53 | 21 |

FIG.6B

ARRANGEMENT PATTERN MATRIX r(x, y)

| 0 | 8 | 2 | 10 |
|---|---|---|---|
| 12 | 4 | 14 | 6 |
| 3 | 11 | 1 | 9 |
| 15 | 7 | 13 | 5 |

FIG.6C

| 0 | 7 | 2 |
|---|---|---|
| 8 | 4 | 6 |
| 3 | 5 | 1 |

FIG.6D

| 0 | 2 |
|---|---|
| 3 | 1 |

DITHER METHOD AND PRINTING APPARATUS

BACKGROUND OF THE INVENTION

1. Field of the Invention

The present invention relates to a dither method and a printing apparatus adopting the dither method.

2. Description of the Related Art

Conventionally known is an electrophotographic color printer which prints an image on a sheet of paper through the use of toners of four colors of yellow (Y), magenta (M), cyan (C) and black (K) by setting each of dots for one color ON (transferring a toner) or OFF (transferring no toner) and thereafter setting each of dots for another color ON or OFF in accordance with image data. In the case of printing a halftone image with the electrophotographic color printer, the number of dots per unit area (e.g. 1 pixel) is varied. This is known as dithering, which is an area gradation technique of comparing the values representing the tones of colors (gradations) in an image to be printed with a threshold value calculated by a predetermined rule and determining printing/non-printing in accordance with whether the values representing the tones are equal to or greater/less than the threshold value.

There are two types of dithering methods. One is a conditional determination method of determining the threshold values of the pixels which are to form an image in a gradation of colors, in consideration of the tones of colors of their circumferential pixels. The other is an independent determination method of determining the threshold values without taking the tones of colors of the circumferential pixels into consideration. Generally speaking, the independent determination method is easier than the conditional determination method, and the processing according to the independent determination method can be executed at higher speed. In light of this, the independent determination method is often employed to print halftone images with a color printer.

However, the color printer which represents halftones according to the above-described dithering methods, in particular, one known as the independent determination method, has the following problem:

Image data items corresponding to pixels forming an image such as a character or figure to be printed are each expressed in two values representing printing/non-printing (ON/OFF). Due to this, when representing halftones according to the independent determination method, mask patterns of the number corresponding to the number of tones of colors in an image to be printed have to be prepared based on a threshold matrix whose elements are expressed using 0 and 1. Therefore, as the number of gradations to be represented increases, the mask patterns of the number corresponding thereto become necessary, which results in a large-capacity memory being required.

The color printer prints a color image on a sheet of paper by printing monochrome images of the colors Y, M, C and K so as to be superposed on one another. In order to represent halftones with the Y, M, C and K monochrome images, the color printer may use the same mask pattern for Y, M, C and K pixels if those pixels are to be printed having the same gradation. In this case, however, moire can occur if the printer fails to print the images of the individual colors in the appropriate positions on the sheet of paper. In consideration of this, the mask patterns of the number corresponding to the number of gradations to be represented have to be prepared for each of the colors Y, M, C and K.

SUMMARY OF THE INVENTION

It is accordingly an object of the present invention to provide both a dithering method, which does not require that mask patterns for dithering be prestored in a storage medium such as a ROM and which therefore can reduce the capacity of the storage medium, and a printing apparatus employing the dithering method.

According to the first aspect of the present invention, in order to achieve the above-described object, there is provided a dithering method comprising:

a matrix storing step of storing in a first memory a matrix of elements serving as pieces of order information;

a mask pattern creating step of determining mask locations in accordance with the pieces of order information in the matrix and creating mask patterns each conforming to one of gradations in an image to be printed;

a dithering step of masking image data with the mask pattern conforming to one of the gradations which corresponds to the image data; and an image developing step of developing the image data masked by the dithering step in a frame memory.

In the above-described dithering method, the mask patterns conforming to the gradations in the image to be printed are created by the mask pattern creating step in accordance with the matrix stored in the first memory. Thus, it is not necessary to prestore such mask patterns for dithering in a storage medium such as a ROM. Accordingly, the storage capacity of the storage medium can be reduced.

The above dithering method may further comprise a mask pattern storing step of storing the mask patterns created by the mask pattern creating step in a second memory. In this case, of the mask patterns stored in the second memory by the mask pattern storing step, the mask pattern conforming to the gradation corresponding to the image data is used to mask the image data in the dithering step.

In the above dithering method, the first memory may be a nonvolatile storage medium (e.g. a ROM). In this case, the matrix storing step is a step of prestoring the matrix in the nonvolatile storage medium.

In the above dithering method, the matrix can include a basic matrix having elements serving as pieces of order information and an arrangement matrix having elements serving as pieces of order information specifying an order in which the elements of the basic matrix are arranged. In this case, the mask pattern creating step is a step of determining the mask locations in accordance with the pieces of order information in the basic matrix and the pieces of arrangement information in the arrangement matrix, in order to create the mask patterns.

The use of the basic matrix and the arrangement matrix permits a unit for dithering to be variable. Even in the case where the number of dots, which is the unit for dithering, becomes large, the capacity of the storage medium for storing the matrices need not be increased significantly.

The above dithering method may further comprise:

a checking step of checking, in the mask pattern storing step, a storage capacity of the second memory which can store the mask patterns; and a gradation number determining step of determining the number of gradations which corresponds to the number of mask patterns the second memory can store with the storage capacity checked by the checking step.

In this case, the mask pattern creating step is a step of creating mask patterns of the number determined by the gradation number determining step.

In the above case, since the number of gradations is determined in the gradation number determining step in accordance with the capacity reserved as the second memory, the storage medium (e.g. a RAM) employed as the second memory can be used with efficiency.

According to the second aspect of the present invention, in order to achieve the above-described object, there is provided a printing apparatus comprising:

- a first memory for storing a matrix of elements serving as pieces of order information;
- mask pattern creating means for determining mask locations in accordance with the pieces of order information in the matrix stored in the first memory and creating mask patterns each conforming to one of gradations in an image to be printed;
- a second memory for storing the mask patterns created by the mask pattern creating means;
- mask means for masking image data input from a host apparatus with the mask pattern conforming to one of the gradations which corresponds to the image data;
- a frame memory in which the image data masked by the mask means is developed; and
- printing means for printing on a sheetlike recording medium an image which the image data developed in the frame memory represents.

In the above-described printing apparatus, the mask pattern creating means creates the mask patterns conforming to the gradations in the image to be printed, in accordance with the matrix stored in the first memory. Thus, it is not necessary to prestore such mask patterns for dithering in a storage medium such as a ROM. Accordingly, the storage capacity of the storage medium employed as the first memory can be reduced.

In the above printing apparatus, the frame memory may include a plurality of frame memories in which image data items showing different colors are developed. The first memory can store, in association with the different colors, a plurality of matrices each having elements serving as pieces of information. The mask pattern creating means may create a plurality of mask patterns for each of the different colors by using the plurality of matrices stored in the first memory. The mask means may mask each image data item developed in the plurality of frame memories with the mask patterns created for the color shown by the image data item. The printing means can print a plurality of images on the recording medium in a state of being superposed on one another, the plurality of images corresponding to the image data items developed in the plurality of frame memories and which show the different colors.

In such a printing apparatus for printing a color image, mask patterns for dithering are required for an image of each color in order to prevent moire from occurring. The present invention when applied to such a color image printing apparatus is considerably advantageous as regards that the capacity of the first memory can be reduced.

In the above-described printing apparatus, the matrix may include a basic matrix having elements serving as pieces of order information and an arrangement matrix having elements serving as pieces of order information specifying an order in which the elements of the basic matrix are arranged. In this case, the mask pattern creating means determines the mask locations in accordance with the pieces of order information in the basic matrix and the pieces of arrangement information in the arrangement matrix, in order to create the mask patterns.

In that case, the image data input from the host apparatus may represent pixels each of which corresponds to some of dots forming the printed image, and the above-described printing apparatus may further comprise discriminating means for discriminating the number of dots corresponding to one pixel. It is preferred that the basic matrix correspond to one pixel.

In the above-described case, the use of the basic matrix and the arrangement matrix permits a unit for dithering to be variable. Even in the case where the number of dots, which is the unit for dithering, becomes large, the capacity of the storage medium employed as the first memory need not be increased significantly.

The above-described printing apparatus may further comprise:

- checking means for checking a storage capacity of the second memory; and
- gradation number determining means for determining the number of gradations which corresponds to the number of mask patterns the second memory can store with the storage capacity checked by the checking means.

In that case, the mask pattern creating means creates mask patterns of the number determined by the gradation number determining means.

In the above-described case, since the number of gradations is determined in the gradation number determining in accordance with the capacity reserved as the second memory, the storage medium (e.g. a RAM) employed as the second memory can be used with efficiency.

The mask pattern creating means of the above-described printing apparatus may include adjusting means for adjusting the mask patterns created so that the image which is printed on the recording medium conforms in gradation to the image to be printed.

In that case, the first memory stores a plurality of matrices and pieces of adjustment information in association with each other, the plurality of matrices being different from each other in an arrangement of elements, and the pieces of adjustment information being used for adjusting the mask patterns so that the image which is printed on the recording medium conforms in gradation to the image to be printed. The adjusting means adjusts the mask patterns in accordance with the pieces of adjustment information.

In the above printing apparatus, the first memory, for example, may be a nonvolatile storage medium (e.g. a ROM), while the second memory may be a volatile storage medium (e.g. a RAM).

BRIEF DESCRIPTION OF THE DRAWINGS

FIG. 3 is a diagram showing a threshold matrix stored in the ROM illustrated in FIG. 2;

FIGS. 5A to 5I are diagrams exemplifying mask patterns created by the process shown in the flowchart of FIG. 4;

FIG. 6A is a diagram showing a basic pattern matrix stored in the ROM illustrated in FIG. 2;

FIGS. 6B to 6D are diagrams showing arrangement pattern matrices stored in the ROM illustrated in FIG. 2 according to the second embodiment of the present invention;

DETAILED DESCRIPTION OF THE PREFERRED EMBODIMENT

First Embodiment

The first embodiment of the present invention will now be described with reference to the accompanying drawings.

Exemplified in the first embodiment is an electrophotographic color printer which prints a color image on a sheet of paper through the use of toners of four colors yellow (Y), magenta (M), cyan (C) and black (K) by printing dithered halftone images of the individual colors so as to be superposed on one another.

Figure 1:
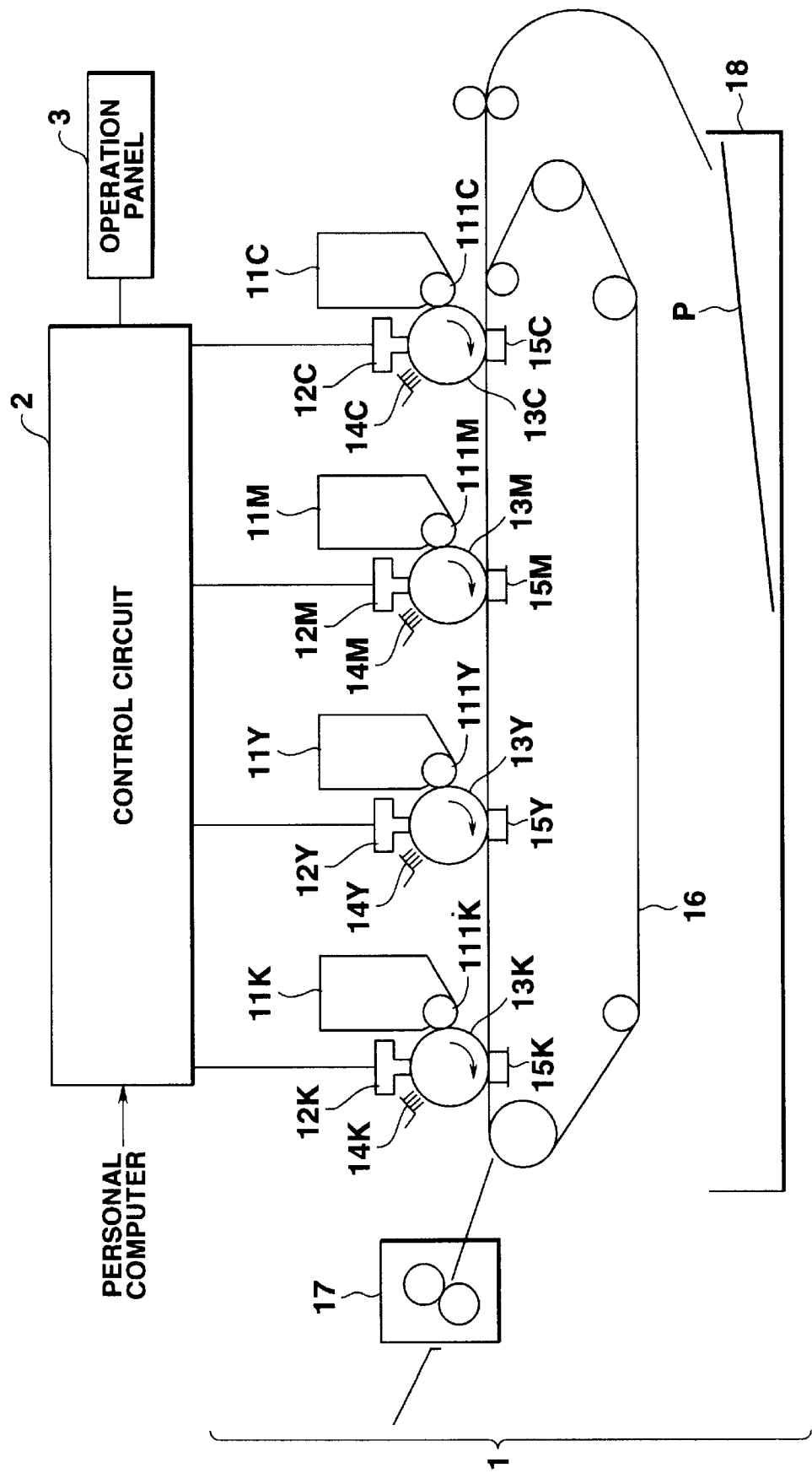
FIG. 1 is a diagram showing the structure of a color printer according to the first embodiment of the present invention.

FIG. 1 is a diagram showing the structure of the color printer according to the first embodiment. As shown in FIG. 1, the color printer includes a printer engine 1, a control circuit 2 for controlling the operation of the printer engine 1, and an operation panel 3 for externally providing instructions to the color printer.

The printer engine 1 includes developing units 11K (black), 11Y (yellow), 11M (magenta), 11C (cyan), LED heads 12K, 12Y, 12M, 12C, photosensitive drums 13K, 13Y, 13M, 13C, charging brushes 14K, 14Y, 14M, 14C, transfer units 15K, 15Y, 15M, 15C, a conveying belt 16, a fixing unit 17 and a sheet feeding cassette 18. The developing units 11K, 11Y, 11M and 11C include developing rollers 111K, 111Y, 111M and 111C, respectively.

The developing units 11K, 11Y, 11M and 11C bear the toners of their corresponding colors and adhere the toners to the photosensitive drums 13K, 13Y, 13M and 13C via the developing rollers 111K, 111Y, 111M and 111C, respectively. The LED heads 12K, 12Y, 12M and 12C emit light in accordance with image data sent from the control circuit 2. The photosensitive drums 13K, 13Y, 13M and 13C are charged with electricity by the charging brushes 14K, 14Y, 14M and 14C, respectively, and are exposed to the light emitted from the LED heads 12K, 12Y, 12M and 13C. The toners are adhered via the developing rollers 111K, 111Y, 111M and 111C to those parts of the photosensitive drums 13K, 13Y, 13M and 13C which have been exposed to the light. The transfer units 15K, 15Y, 15M and 15C apply a predetermined voltage to the photosensitive drums 13K 13Y, 13M and 13C through a sheet of paper P, thereby transferring the toners to the sheet of paper P from the photosensitive drums 13K, 13Y, 13M and 13C. The conveying belt 16 conveys, one by one, sheets of papers held in the sheet feeding cassette 18. The fixing unit 17 has a heater, which generates heat to fix the toners transferred by the transfer units 15K, 15Y, 15M and 15C to the sheet of paper P. The sheet feeding cassette 18 holds plural sheets of paper P.

Figure 2:
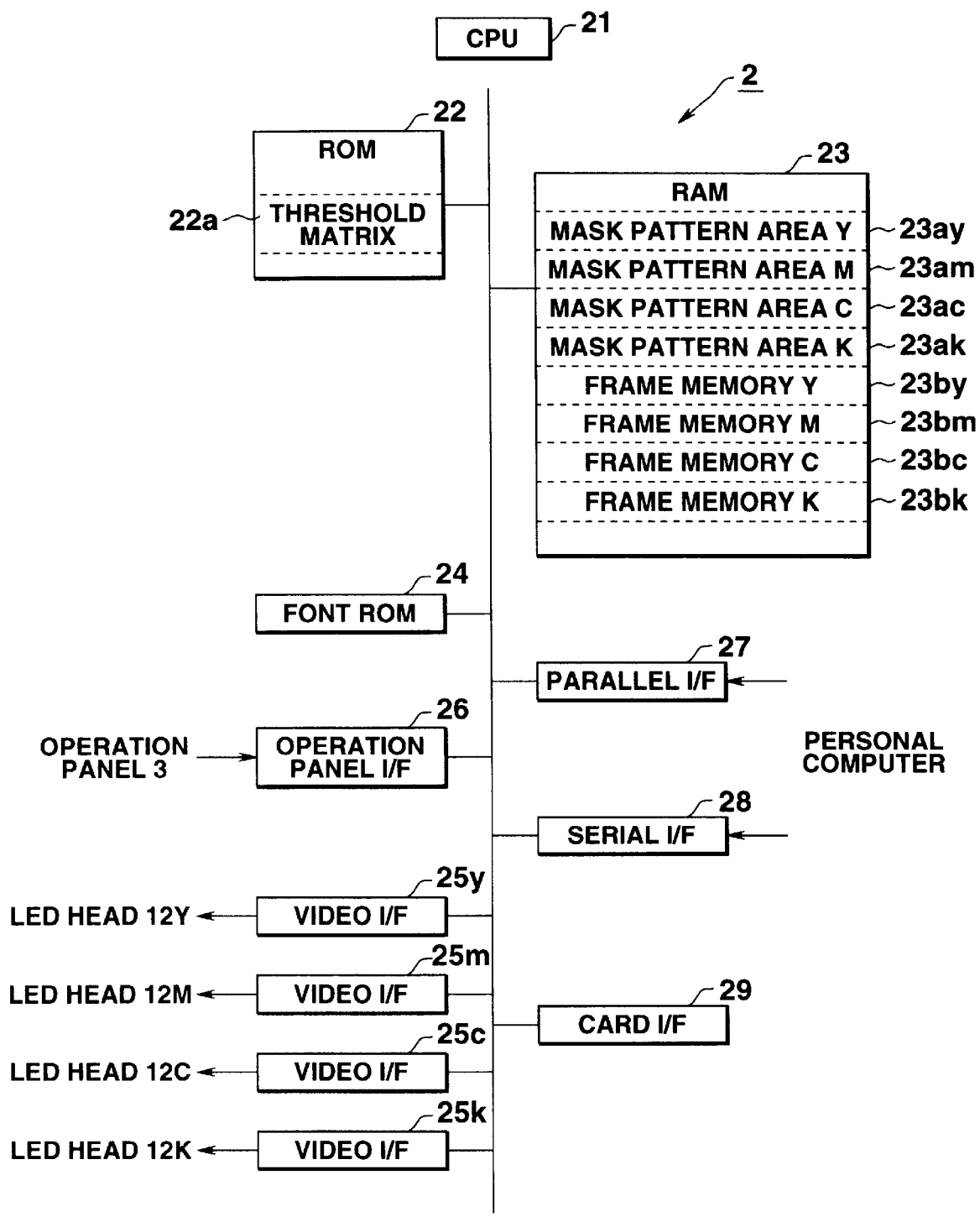
FIG. 2 is a block diagram showing the structure of a control circuit in the color printer illustrated in FIG. 1.

As shown in FIG. 2, the control circuit 2 has a CPU 21, a ROM 22, a RAM 23, a font ROM 24, a video interfaces 25y, 25m, 25c, 25k, an operation panel interface 26, a parallel interface 27, a serial interface 28, a card interface 29, all being connected to each other via a bus.

The CPU 21 executes a program stored in the ROM 22, performs various processing necessary to print images, and controls the individual internal parts of the control circuit 2. The CPU 21 generates a mask pattern (described later) in accordance with gradation information contained in print information sent from a host such as a personal computer through the parallel interface 27 or the serial interface 28, and stores the mask pattern in mask pattern areas 23ay, 23am, 23ac or 23ak of the RAM 23. In accordance with the print information sent from the host such as a personal computer through the parallel interface 27 or the serial interface 28, the CPU 21 develops the corresponding image data in frame memories 23by, 23bm, 23bc and 23bk. Further, the CPU 21 controls the operations of the individual parts of the printer engine 1 via a drive circuit (not shown).

The ROM 22 stores a processing program for the CPU 21, and has an area 22a for storing a threshold matrix used to generate a dithering mask pattern which will be described later. FIG. 3 shows an example of the threshold matrix. In this example, the threshold matrix is an 8×8 matrix, and each of the individual elements constituting the threshold matrix corresponds to one of the dots forming an image to be printed. The numerals shown in the individual elements of the threshold matrix indicate the order of priority in which the dots are set ON (the transfer of the toners) in accordance with the gradations in the original image input from the host. A plurality of threshold matrices are prepared each for one of the colors Y, M, C and K.

The RAM 23 has the mask pattern areas 23ay, 23am 23ac and 23ak, the frame memories 23by, 23bm, 23bc and 23bk, a buffer area and a work area for the CPU 21. The buffer area stores the print information which is sent from the host through the parallel interface 27 or the serial interface 28 and which contains any character code and position information concerning an image to be printed, the gradation information specifying to the gradations in the image to be printed, etc. The mask pattern areas 23*ay*, 23*am*, 23*ac* and 23*ak* store the mask patterns created in accordance with the threshold matrices for the colors Y, M, C and K. Font patterns read out from the font ROM 24 in accordance with character codes, for example, are developed in the frame memories 23*by*, 23*bm*, 23*bc* and 23*bk*.

The font ROM 24 stores the font patterns corresponding to the character codes. The video interfaces 25*y*, 25*m*, 25*c* and 25*k* are connected to the LED heads 12Y, 12M, 12C and 12K of the printer engine 1, respectively. Image data stored in the frame memories 23*by*, 23*bm*, 23*bc* and 23*bk* are sent to the LED heads 12Y, 12M, 12C and 12K through the video interfaces 25*y*, 25*m*, 25*c* and 25*k*. The operation panel interface 26 is connected to the operation panel 3. The parallel interface 27 and the serial interface 28 are to be connected to the host such as a personal computer. The card interface 29 is to be connected to a card such as a function expansion card inserted in a card slot (not shown).

The operation panel 3 illustrated in FIG. 1 has switches like an environment setting switch, a mode setting switch and a reset switch. When a user operates a switch provided on the operation panel 3, a command is sent to the control circuit 2.

The operation of the color printer according to the first embodiment will now be described.

When the print information is sent from the host such as a personal computer through the parallel interface 27 or the serial interface 28, the print information is stored in the buffer area of the RAM 23. Upon receiving the print information, the CPU 21 generates mask patterns of the number corresponding to the gradation information contained in the print information.

Figure 4:
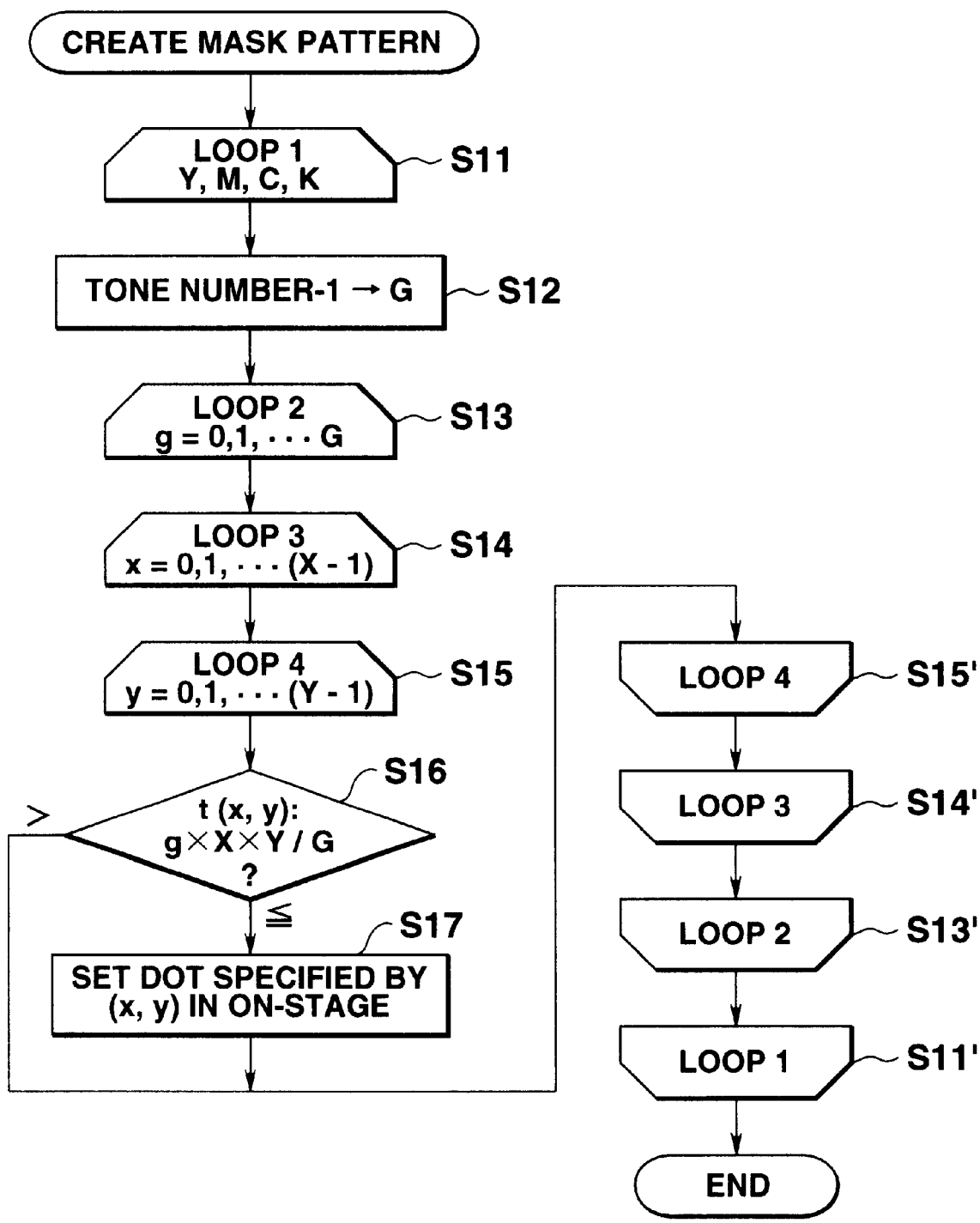
FIG. 4 is a flowchart showing a mask pattern creating process according to the first embodiment of the present invention.

FIG. 4 is a flowchart showing a process by which the CPU 21 of the color printer according to the first embodiment generates a mask pattern.

When the number of horizontal dots per row in the threshold matrix forming the mask pattern is given as X and the number of vertical dots per column in the threshold matrix is given as Y, the x coordinates of the horizontal elements of the threshold matrix are represented as x=0, 1, ..., X-1, while the y coordinates of the vertical elements of the threshold matrix are represented as y=0, 1, ..., Y-1. The threshold values shown in the individual elements forming the threshold matrix are represented as t (x, y). The tone of color of each pixel in an image is expressed in an integral number equal to or greater than 0 (the integral numbers representing the tones of colors of the pixels will be hereinafter referred to as the tone numbers). The greater the tone numbers, the deeper the colors.

In the flowchart shown in FIG. 4, mask patterns of the number according to the gradation information are created for the individual colors Y, M, C and K, based on the threshold matrices stored in the ROM 22 [loop 1 (steps S11 and S11')].

In the loop 1 (the steps S11 and S11'), the CPU 21 reads out, from that buffer area of the RAM 23 which stores the gradation information, the tone number specifying the tone of color of each pixel in the image to be printed, and substitutes the value obtained by subtracting 1 from the tone number for a variable G (step S12).

After the CPU 21 substitutes the value obtained by subtracting 1 from the tone number for the variable G in the step S12, it executes a process for creating mask patterns one in association with each of the values 0 to G of gradations "g" [loop 2 (steps S13 to S13')].

In the loop 2 (the steps S13 and S13'), the CPU 21 sequentially changes the values of x and y, and determines whether to set a dot ON (transfer a toner) or to set a dot OFF (transfer no toner) in regard to every combination of (x, y) [loop 3 (steps S14 and S14') and loop 4 (steps S15 and S15')].

In the loop 3 (the steps S14 and S14') and the loop 4 (the steps 15 and 15'), the CPU 21 performs the arithmetic operation shown below as formula (1), and determines whether the formula (1) is satisfied or not (step S16):

$$t (x, y) < g \times X \times Y/G \qquad (1)$$

When the CPU 21 determines in the step S16 that the formula (1) is not satisfied, it executes no processing and goes to the steps to be carried out as regards the next combination of (x, y) shown in the loops 3 and 4. When the CPU 21 determines in the step 16 that the formula (1) is satisfied, it sets ON the dot specified by the coordinates (x, y) on a mask pattern to be created (step S17), and goes to the steps to be carried out as regards the next combination of (x, y) shown in the loops 3 and 4.

The loops 3 and 4 terminate when the steps S16 and S17 have been executed in association with all combinations of (x, y). The loop 2 terminates when the loop 3 has been executed in association with all values of the gradations "g". The loop 1 terminates when the loop 2 has been executed in regard to all of the colors Y, M, C and K. The mask patterns for Y, M, C and K are created in the above-described manner, and are stored in the mask pattern areas 23*ay*, 23*am*, 23*ac* and 23*ak*. The number of mask patterns stored in each mask pattern area corresponds to the number of tones.

The mask pattern creating process described above will now be described giving a specific example.

This example is connected with the threshold matrix shown in FIG. 3, and X and Y are given as X=8 and Y=8. The number of tones, which is designated by the gradation information contained in the print information, is nine. Mask patterns for only one color are shown in this example. However, mask patterns for the other colors are created as well.

In the case of a gradation "g" of 0 in the first processing within the loop 2 (the steps S13 and S13'), the relation t (x, y)<0 is attained as a result of the arithmetic operation shown by the formula (1). No threshold values satisfy this relation (the step S16). Hence, as shown in FIG. 5A, no dot is set ON in a mask pattern in the case of a gradation "g" of 0.

In the case of a gradation "g" of 1 in the next processing within the loop 2, the relation t (x, y)<8 is attained as a result of the arithmetic operation shown by the formula (1). When both x and y are 0, t (x, y) is expressed as t (0, 0), which corresponds to the threshold value 0. This threshold value satisfies the above relation (the step S16), and consequently the dot specified by the coordinates (0, 0) is set ON. When x and y are 0 and 1, respectively, t (x, y) is expressed as t (0, 1), which corresponds to the threshold value 32. This threshold value does not satisfy the above relation, and therefore the dot specified by the coordinates (0, 1) is kept OFF. Similarly the processing within the loops 3 and 4 is all performed, as a result of which the mask pattern shown in FIG. 5B, where predetermined dots have been set ON, is created.

FIGS. 5C to 5I show the mask patterns created by the above-described process in the case of gradations "g" of 2 to G.

In the case of developing image data of the colors Y, M, C and K in the frame memories 23*by*, 23*bm*, 23*bc* and 23*bk*, respectively, in accordance with color information, character codes, etc. which are contained in the print information sent from the host, mask pattern data corresponding to the tones specified by the color information is read out from the mask pattern areas 23*ay*, 23*am*, 23*ac* and 23*ak*, and AND operations are performed with respect to the image data and the corresponding dots in the mask patterns.

When 1-page image data has been developed in the frame memories 23*by*, 23*bm*, 23*bc* and 23*bk*, the CPU 21 reads out, for example, 1-line data from the frame memory 23*bc* storing the image data of the color C the toner of which is to be transferred first on a sheet of paper P, and outputs the read-out data as parallel data to the video interface 25*c*. The video interface 25*c* converts the parallel data to serial data, and sequentially outputs the serial data to the LED head 12C. After outputting the data of the color C, the CPU 21 similarly processes the data of the color M. After outputting the data of the color M, the CPU 21 also processes the data of the color Y as well. After outputting the data of the color Y, the CPU 21 processes the data of the color K as well. After outputting the data of the color K, then the CPU 21 similarly processes the next-line data of the color C.

In accordance with the image data output thus, the LED heads 12C, 12M, 12Y and 12K radiate light onto their respective photosensitive drums 13C, 13M, 13Y and 13K in synchronization with each other, under the control of the CPU 21. The toners supplied from the developing units 11C, 11M, 11Y and 11K are adhered through the developing rollers 111C, 111M, 111Y and 111K to those parts of the photosensitive drums 13C, 13M, 13Y and 13K which are exposed to the light. The photosensitive drums 13C, 13M, 13Y and 13K are in synchronization with each other under the control of the CPU 21, and the toners of the individual colors C, M, Y and K are sequentially transferred to a sheet of paper P via the transfer units 15C, 15M, 15Y and 15K, whereby images in the colors C, M, Y and K are formed on the sheet of paper P with being superposed on one another, thus printing a color image on the sheet of paper P.

According to the color printer of the first embodiment, as described above, the mask patterns for realizing halftones are created in accordance with a threshold matrix. The mask patterns need not be prestored in the ROM 22. The number of mask patterns to be created needs only be equal to the number of tones.

Second Embodiment

The second embodiment of the present invention will now be described with reference to the accompanying drawings.

Explained in the second embodiment is a color printer which uses, as threshold matrices, two types of matrices which are a basic pattern matrix and an arrangement pattern matrix.

The structure of the color printer according to the second embodiment is substantially the same as that of the first embodiment, except that a threshold matrix stored in the ROM 22 of the color printer of the second embodiment is different from that of the first embodiment. The number of dots forming the threshold matrix is variable. The print information sent from the host contains information (hereinafter referred to as the pixel information) indicating the number of dots forming a print image which is output from the printer and which corresponds to 1 pixel in the original image input from the host.

The threshold matrix of the second embodiment will now be described. The threshold matrix is constituted by the basic pattern matrix shown in FIG. 6A and the arrangement pattern matrices shown in FIGS. 6B to 6D.

The basic pattern matrix is a basic-unit matrix forming the threshold matrix. FIG. 6A shows the case where the basic-unit matrix consists of 8×8 dots. The arrangement pattern matrices are used to create mask patterns based on that threshold matrix. FIGS. 6B to 6D show the arrangement patterns to create mask patterns in the case where the number of vertical dots and the number of horizontal dots are quadrupled, trebled and doubled. By adopting a combination of the basic pattern matrix shown in FIG. 6A and the arrangement pattern matrix shown in FIG. 6B, mask patterns in the case of 1024 dots (=(8×4)×(8×4) dots) can be created. By employing a combination of the basic pattern matrix shown in FIG. 6A and the arrangement pattern matrix shown in FIG. 6C, mask patterns in the case of 576 dots (=(8×3)×(8×3) dots) can be created. By adopting a combination of the basic pattern matrix shown in FIG. 6A and the arrangement pattern matrix shown in FIG. 6D, mask patterns in the case of 256 dot (=(8×2)×(8×2) dots) can be created. The basic pattern matrix of FIG. 6A and the arrangement pattern matrices of FIGS. 6B to 6D are prepared for each of the colors Y, M, C and K.

The operation of the color printer according to the second embodiment will now be described.

When the print information is supplied from a host such as a personal computer through the parallel interface 27 or the serial interface 28, the print information is stored in the buffer area of the RAM 23. Upon reception of the print information, the CPU 21 creates the threshold matrix according to the pixel information contained in the print information.

Figure 7:
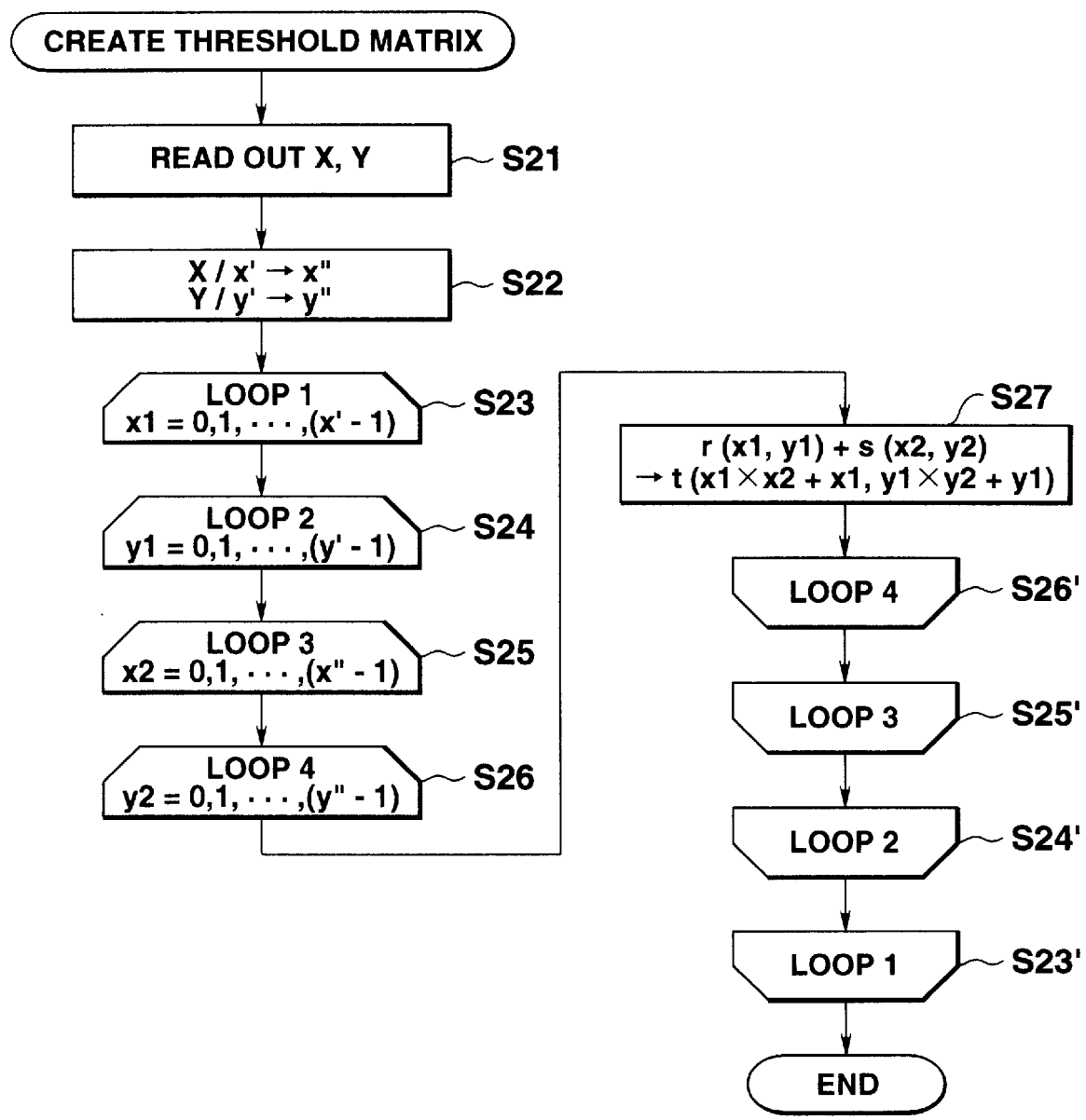
FIG. 7 is a flowchart showing a threshold matrix creating process according to the second embodiment of the present invention.

FIG. 7 is a flowchart showing a threshold matrix creating process executed by the CPU 21 of the color printer according to the second embodiment.

Here the number of vertical dots and the number of horizontal dots in the basic unit of the mask patterns are given as x' and y', respectively. The x coordinates of the elements of the basic pattern matrix are represented as x1=0, 1, . . . , (x'-1), while the y coordinates of those elements are represented as y1=0, 1, . . . , (y'-1). The threshold values shown in the elements of the threshold matrix are expressed as s(x1, y1). The number of vertical dots and the number of horizontal dots in a print image, which corresponds to 1 pixel in the original image, are given as X and Y, respectively, and are specified by the print information. The arrangement pattern matrix to be used is determined by x" and y" obtained in the manner which will be explained later. The x coordinates of the elements of the threshold matrix are represented as x2=0, 1, . . . , (x"-1), while the y coordinates of those elements are represented as y2=0, 1, . . . , (y"-1). The numerals shown in the individual elements of the threshold matrix are represented as r (x2, y2).

When the process starts, the CPU 21 reads out, from that buffer area of the RAM 23 which stores the pixel information, the number X of vertical dots and the number Y of horizontal dots of the print image to be reproduced from 1 pixel in the original image (step S21). The CPU 21 divides X by x', and substitutes the result of the division for x". The CPU 21 divides Y by y", and substitutes the result of the division for y" (step S22). An arrangement pattern matrix to be used to create the threshold matrix is determined in accordance with the result of the calculations in the step S22.

When the CPU 21 finishes the processing in the step S22, it executes the processing within four loops 1 to 4. In the loop 1, the value x1 representing an x coordinate on the basic pattern matrix is changed from 0 to (x'-1) (steps S23 and S23'). In the loop 2, the value y1 representing a y coordinate on the basic pattern matrix is changed from 0 to (y'-1) (steps S24 and S24'). In the loop 3, the value x2 representing an x coordinate on the basic pattern matrix is changed from 0 to (x"-1) (step S25 and S25'). In the loop 4, the value x2 representing a y coordinate on the basic pattern matrix is changed from 0 to (y"-1) (steps S26 and S26').

In the four loops 1 to 4, the CPU 21 executes the processing shown by the formula (2). Specifically, the CPU 21 obtains the numerals in the individual elements of the threshold matrix to be created (step S27).

$$r(x1, y1)+s(x2, y2) \rightarrow (x1 \times x2+x2, y1 \times y2+y2) \qquad (2)$$

The threshold matrix is created as a result of the processing within the four loops 1 to 4 being finished. The creation of the threshold matrix is performed in association with each of the colors Y, M, C and K.

Figure 8:
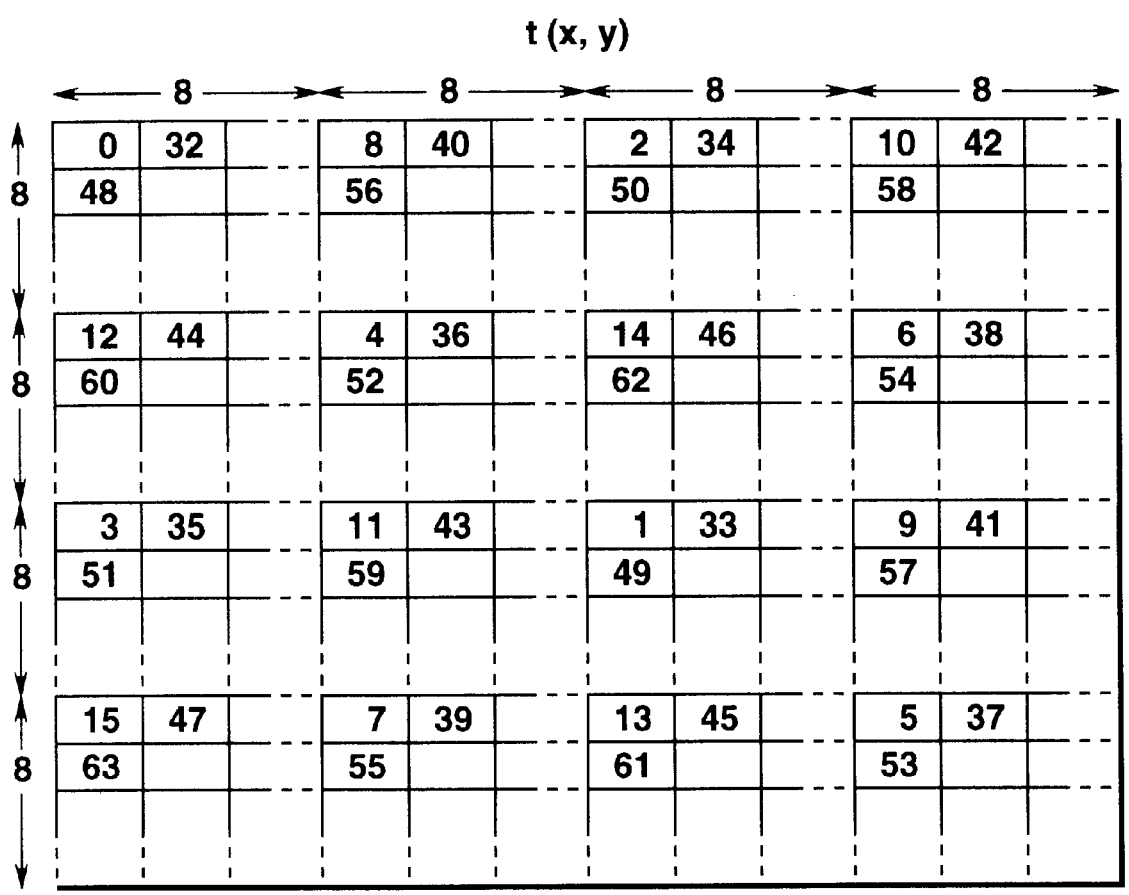
FIG. 8 is a diagram exemplifying the threshold matrix created by the process shown in the flowchart of FIG. 7.
Figure 9:
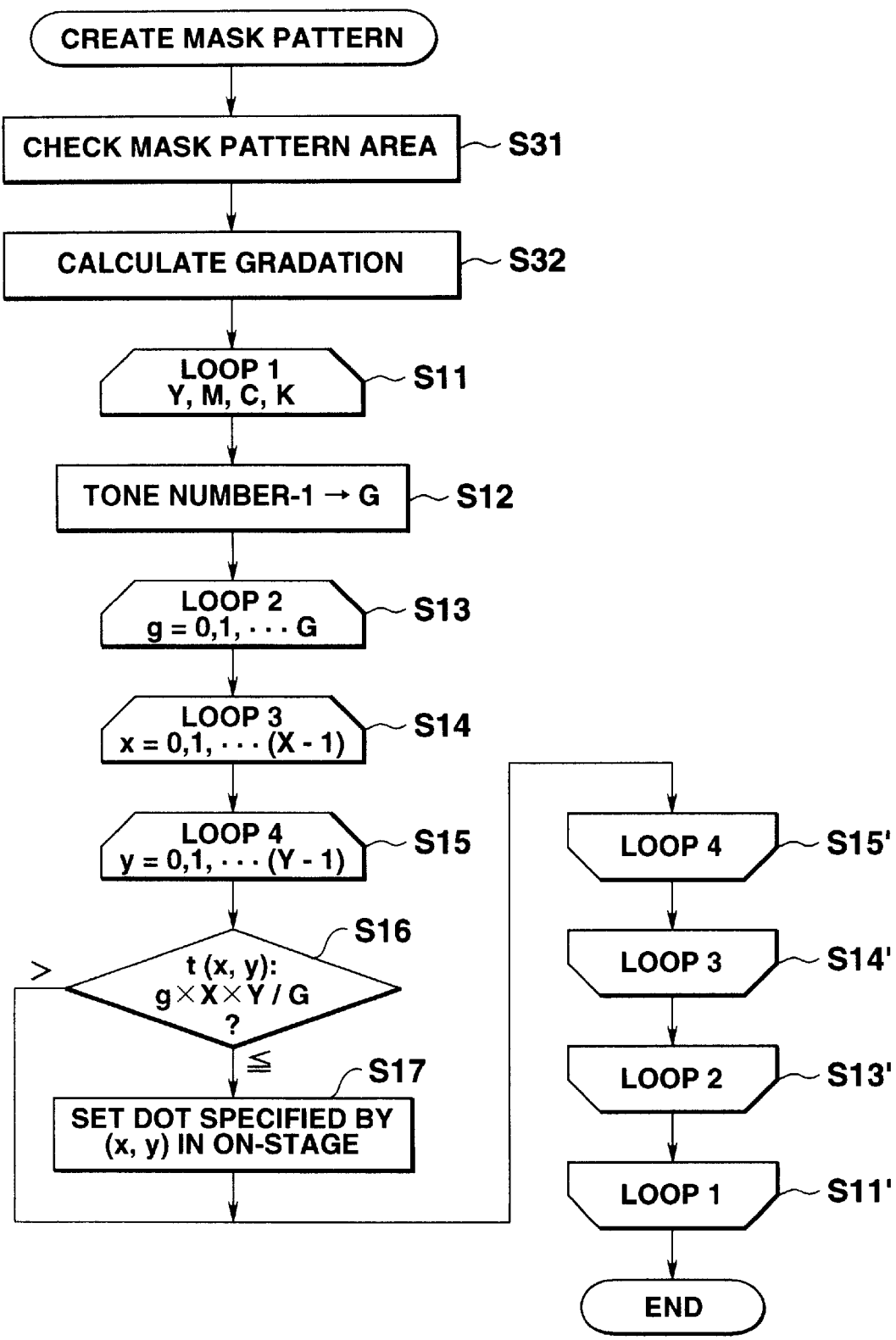
FIG. 9 is a flowchart showing a mask pattern creating process according to the third embodiment of the present invention.

FIG. 8 shows an example of the threshold matrix created by the above-described process. The threshold matrix in this example is one created using the basic pattern matrix shown in FIG. 6A and the arrangement patter matrix shown in FIG. 6B.

With the color printer of the second embodiment, mask patterns are created utilizing the threshold matrix created by the above-described process. The processing which the color printer of the second embodiment carries out after the mask pattern creating process is the same as that of the first embodiment.

As described above, the threshold matrix can be created using the basic pattern matrix and an arrangement pattern matrix, and the mask patterns can be created utilizing the threshold matrix as created. In this case, the amount of data prestored in the ROM 22 is smaller than in the case of storing the threshold matrix itself in the ROM 22.

Third Embodiment

The third embodiment of the present invention will now be described in detail, with reference to the accompanying drawings.

Explained in the third embodiment is a color printer which can control the number of tones of colors of the pixels in the image to be printed, in accordance with the capacity of a mask pattern tone area 13a which can be reserved in the RAM 13.

The structure of the color printer according to the third embodiment is substantially the same as that of the first embodiment.

The operation of the color printer according to the third embodiment will now be described.

When the print information is sent from a host such as a personal computer through the parallel interface 27 or the serial interface 28, the print information is stored in the buffer area of the RAM 23. Upon receiving the print information, the CPU 21 creates mask patterns of the number according to the gradation information contained in the print information.

FIG. 7 is a flowchart showing a mask pattern creating process executed by the CPU 21 of the color printer of the third embodiment.

When the process starts, the CPU 21 checks the capacities of areas which can be reserved in the RAM 23 as the mask pattern areas 23ay, 23am, 23ac and 23ak (step S31). The CPU 21 determines the number of mask patterns which can be stored in the areas capable of being reserved as the mask pattern areas 23ay, 23am, 23ac and 23ck, i.e., the number of tones of colors of the pixels in the image to be printed (step S32). The processing carried out thereafter is the same as that of the first embodiment, except that the number of tones calculated in the step S32 is used in the step S12.

In the color printer of the third embodiment, as described above, the number of tones is determined in accordance with the capacities of the areas which can be reserved as the mask pattern areas 23ay, 23am, 23ac and 23ak. This enables the efficient use of the RAM 23.

Fourth Embodiment

The fourth embodiment of the present invention will now be descried with reference to the accompanying drawings.

Explained in the fourth embodiment is a color printer which determines the number of "ON" dots in consideration of the blur of the toners which occurs when the toners are transferred to a sheet of paper and wherein apparent variations in the thickness of an image describe a curve in a graph in accordance with the gradations in the image.

The structure of the color printer of the fourth embodiment is substantially the same as that of the first embodiment, except that in the case of the color printer of the fourth embodiment, the toners transferred to a sheet of paper blur such that the pattern of an image which the toners have formed on the sheet of paper expands. The toners are fixed to the sheet of paper by the fixing unit 17 in the state that the pattern formed by the toners has thus expanded. The ratio of the area of the pattern at the time of the transfer of the toners to the area of the pattern at the time of the fixture of the toners will be hereinafter referred to as the toner blur ratio.

According to the fourth embodiment, the thickness of any pixel in the image to be printed varies almost linearly in accordance with the number of "ON" dots until the number of "ON" dots reaches 50%. In that case, the image thickness C (%) is represented by the following formula (3):

$$C=B \times d/D \quad (100<B<200) \qquad (3)$$

where the blur ratio is B (%), the number of "ON" dots is d, and the total number of dots is D.

Hence, the blur ratio B can be obtained by measuring the image thickness C when the ratio of the number of "ON" dots to the total number of dots is 50%. For example, the blur ratio B is 150% in the case where the image thickness C is 75% when the ratio of the number of "ON" dots to the total number of dots is 50%.

When the ratio of the number of "ON" dots to the total number of dots is in a range of 50% to 100%, the image thickness varies almost linearly. Accordingly, the number of "ON" dots in a target mask pattern is represented by the following formulas (4) and (5):

$$d=D \times C/B (0 \leq C \leq B/2) \qquad (4)$$

$$d=(D/2) \times ((C-(B/2))/(100-B \times 2))+D/2(B/2 \times C \leq 100) \qquad (5)$$

The operation of the color printer according to the fourth embodiment will now be described.

When the print information is sent from a host such as a personal computer through the parallel interface 27 or the serial interface 28, the print information is stored in the buffer area of the RAM 23. Upon receiving the print information, the CPU 21 creates mask patterns of the number according to the gradation information contained in the print information.

Figure 10:
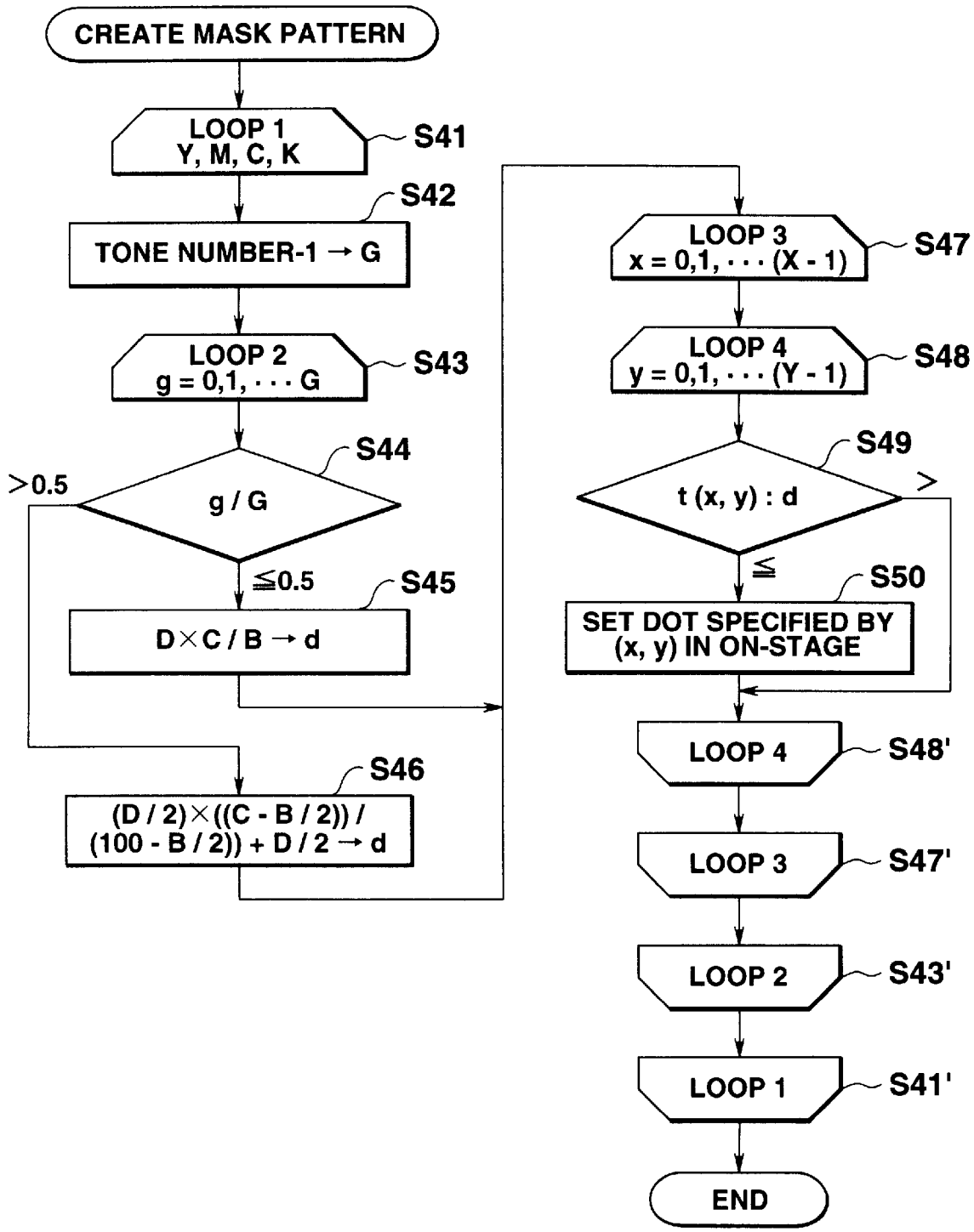
FIG. 10 is a flowchart showing a mask pattern creating process according to the fourth embodiment of the present invention.

FIG. 10 is a flowchart showing a mask pattern creating process executed by the CPU 21 of the color printer of to the fourth embodiment.

In this flowchart, the mask patterns of the number according to the gradation information are created in association with each of the colors Y, M, C and K, based on a threshold matrix stored in the ROM 22 [loop 1 (steps S41 and S41')].

In the loop 1 (the steps S41 and S41'), the CPU 21 reads out, from that buffer area of the RAM 23 which stores the gradation information, the tone number specifying the tone of color of each pixel in the image to be printed, and substitutes the value obtained by subtracting 1 from the tone number for a variable G (step S42).

In a loop 2 (steps S43 and S43'), the CPU 21 divides a gradation or variable "g" by G, thereby calculating the target image thickness C, and determines whether the calculated thickness C is greater or not greater than 0.5 (50%) (step S44).

When the CPU 21 determines in the step S44 that the thickness C is equal to or less than 0.5, it performs the arithmetic operation shown by the formula (4), thereby to obtain the number "d" of ON dots (step S45). When the CPU 21 determines in the step S44 that the thickness C is greater than 0.5, it performs the arithmetic operation shown by the formula (5), thereby to obtain the number "d" of ON dots (step S46).

Then the CPU 21 sequentially changes the values of x and y, and determines whether to set a dot ON (transfer a toner) or to set a dot OFF (transfer no toner) in regard to every combination of (x, y) [loop 3 (steps S47 and S47') and loop 4 (steps S48 and S48')].

In the loop 3 (the steps S47 and S47') and the loop 4 (the steps 48 and 48'), the CPU 21 determines whether each of the numerals t (x, y) in the individual elements forming the threshold matrix is greater or not greater than the number "d" of ON dots obtained in the step S45 or S46 (step S49).

When the CPU 21 determines in the step S49 that t (x, y) is greater than the number "d" of ON dots, it executes no processing and goes to the steps to be carried out as regards the next combination of (x, y) shown in the loops 3 and 4. When the CPU 21 determines in the step 49 that t (x, y) is equal to or less than the number "d" of ON dots, it sets ON the dot specified by the coordinates (x, y) on a mask pattern to be created (step S50), and goes to the steps to be carried out as regards the next combination of (x, y) shown in the loops 3 and 4.

The loops 3 and 4 terminate when the steps S49 and S50 have been executed in association with all combinations of (x, y). The loop 2 terminates when the loop 3 has been executed in association with all values of the gradations "g". The loop 1 terminates when the loop 2 has been executed in regard to all of the colors Y, M, C and K. The mask patterns for Y, M, C and K are created in the above-described manner, and are stored in the mask pattern areas 23*ay*, 23*am*, 23*ac* and 23*ak*.

Figure 11A:
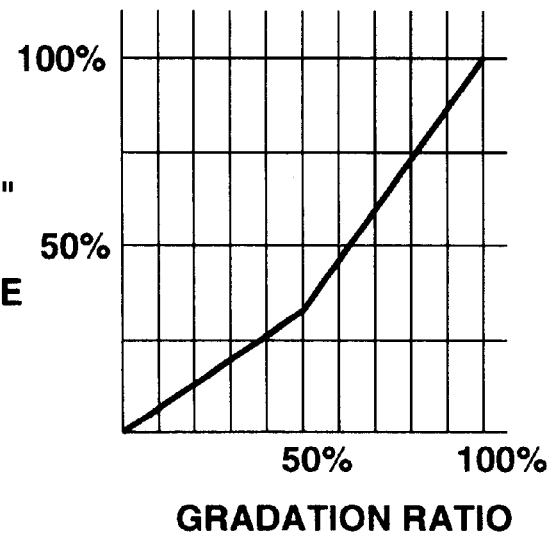
FIG. 11A is a graph showing the relationship between the tone of color (gradation ratio) of a pixel in an image to be printed and the number of ON dots according to the process shown in FIG. 10.
Figure 11B:
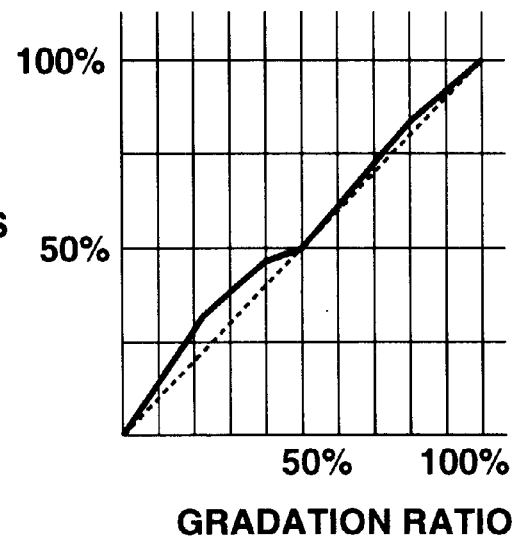
FIG. 11B is a graph showing the relationship between the tone of color (gradation ratio) of a pixel in an image to be printed and the thickness of a pixel in a printed image according to the process shown n FIG. 10.
Figure 12A:
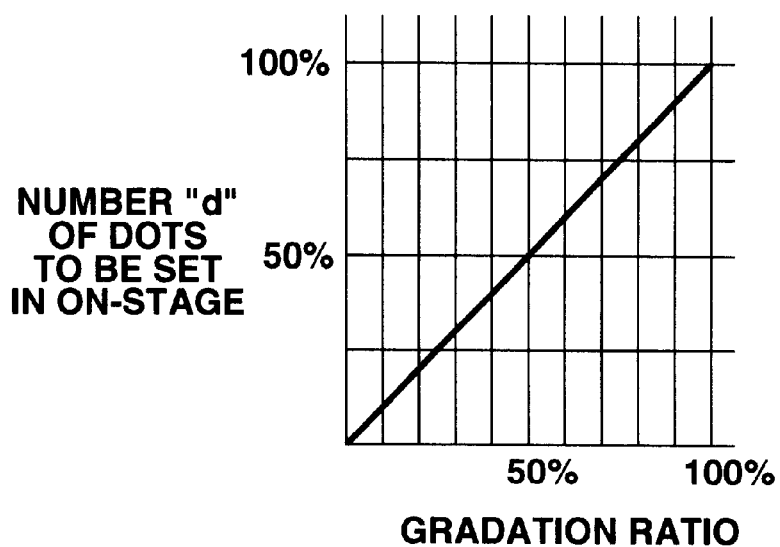
FIG. 12A is a graph showing the relationship between the tone of color (gradation ratio) of a pixel in an image to be printed and the number of ON dots when the number of ON dots is varied linearly.
Figure 12B:
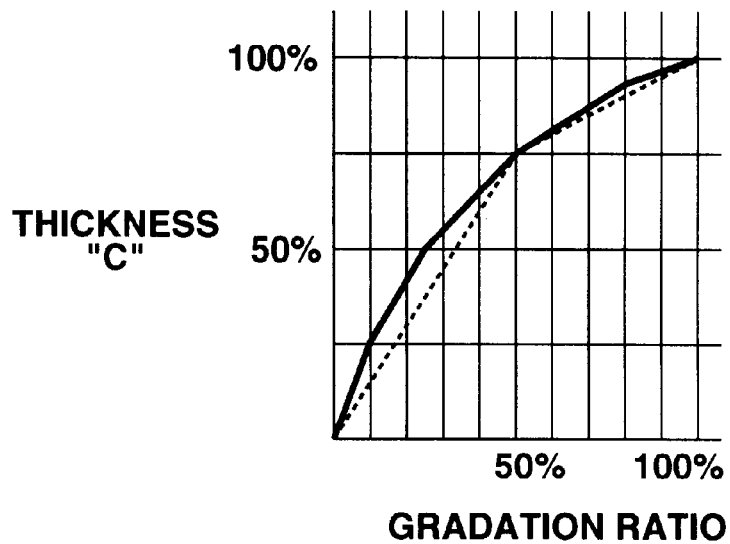
FIG. 12B is a graph showing the relationship between the tone of color (gradation ratio) of a pixel in an image to be printed and the thickness of a pixel in a printed image when the number of ON dots is varied linearly.

FIG. 11A shows an example of the relationship between the tone of color (expressed in the gradation ratio g/G herein) of a pixel in the image to be printed and the number "d" of ON dots according to the above-described process. FIG. 11B shows an example of the relationship between the gradation ratio g/G and the thickness C of a pixel in a printed image according to the above-described process. In this example, the number "d" of ON dots is varied non-linearly, as seen in the graph of FIG. 11A wherein the line showing the relationship bends at the point corresponding to a gradation ratio of 50%. As the number "d" of ON dots is thus varied, the thickness C varies almost linearly as shown in the graph of FIG. 11B. Shown in FIG. 12B for the sake of comparison is the relationship between the gradation ratio r/G and the thickness C in the case (FIG. 12A) where the number "d" of ON dots is varied linearly in relation to the gradation ratio g/G. In this example, as seen in the graph of FIG. 12B, the thickness C varies non-linearly before and after the point corresponding to a gradation ratio of 50%.

In the color printer of the fourth embodiment, as described above, the number "d" of ON dots is determined in consideration of the toner blur ratio so that that the gradations which most approximate to the color tone variations in an image to be printed can be attained in the image as printed.

Fifth Embodiment

The fifth embodiment of the present invention will now be described with reference to the accompanying drawings.

Explained in the fifth embodiment is a color printer which can perform dithering through the use of a plurality of types of dither patterns (mask patterns), which are, for example, center-type dither patterns in which the dots are sequentially set ON from the centers of the pixels, and dispersion-type dither patterns in which the dots which are set ON dispersedly as in the case of the first to fourth embodiments described above.

The structure of the color printer of the fifth embodiment is substantially the same as that of the first embodiment, except that the ROM 22 of the color printer according to the fifth embodiment stores both a threshold matrix to create center-type dither patterns and a threshold matrix to create dispersion-type dither patterns. The ROM 22 also stores the toner blur ratios corresponding to the individual dither patterns. The print information sent from a host connected to the color printer specifies whether to represent gradations through the use of the center-type dither patterns or whether to represent gradations through the use of the dispersion-type dither patterns.

The operation of the color printer according to the fifth embodiment will now be described. When the print information is sent from the host such as a personal computer through the parallel interface 27 or the serial interface 28, the print information is stored in the buffer area of the RAM 23. Upon receiving the print information, the CPU 21 creates mask patterns of the number corresponding to the gradation information contained in the print information.

Figure 13:
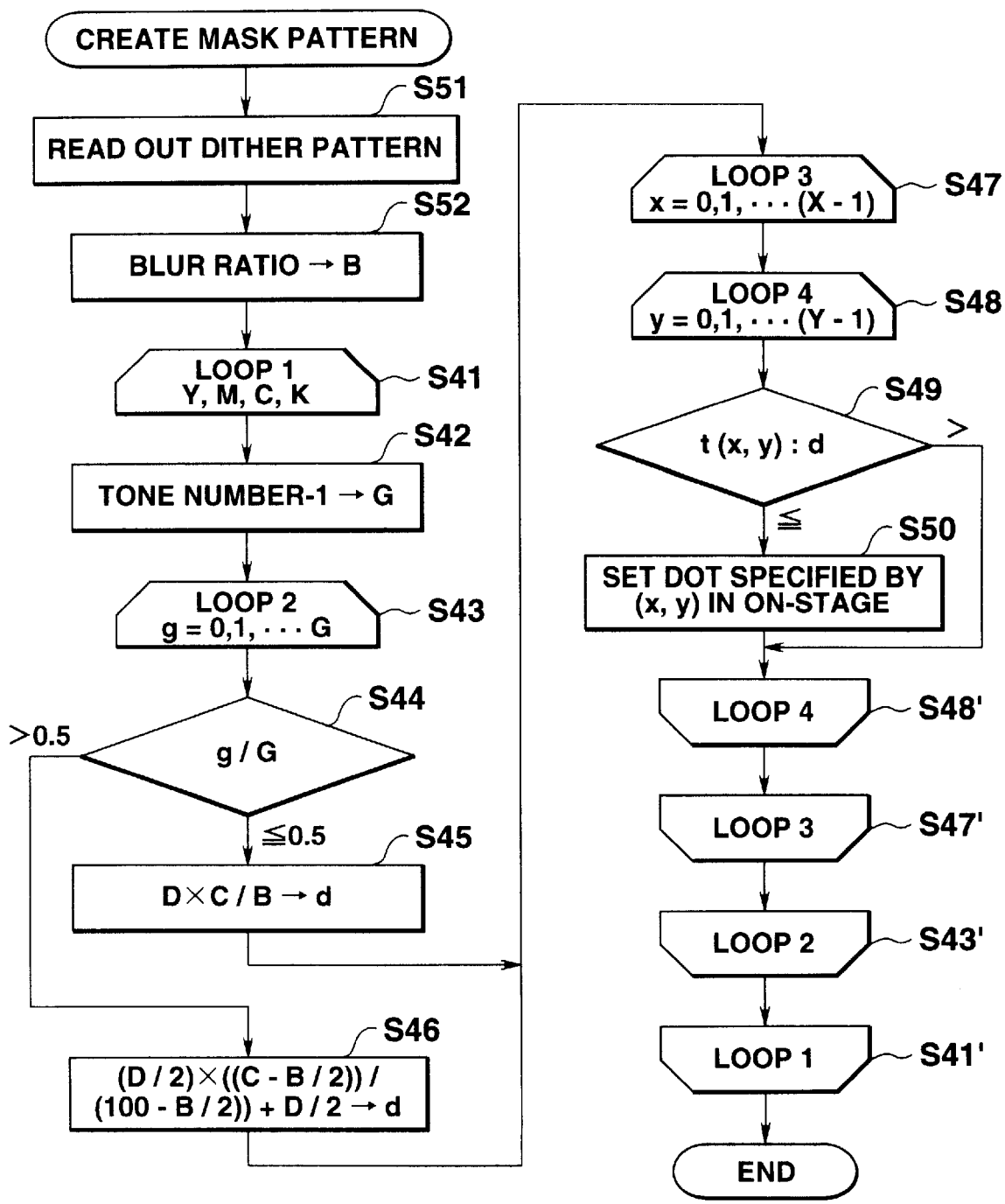
FIG. 13 is a flowchart showing a mask pattern creating process according to the fifth embodiment of the present invention.

FIG. 13 is a flowchart showing a mask pattern creating process executed by the CPU 21 of the color printer according to the fifth embodiment.

When the process starts, the CPU 21 reads out, from that buffer area of the RAM 23 which stores the print information, data specifying the type (the center-type or dispersion-type) of a dither pattern to be used to print pixels which form an image in a gradation of colors (step S51). The CPU 21 reads out from the ROM 22 the toner blur ratio corresponding to the above dither pattern, and substitutes the blue ratio for a valuable B (step S52). The steps carried out thereafter are substantially the same as the steps S41 to S50 explained in the fourth embodiment.

Figure 14A:
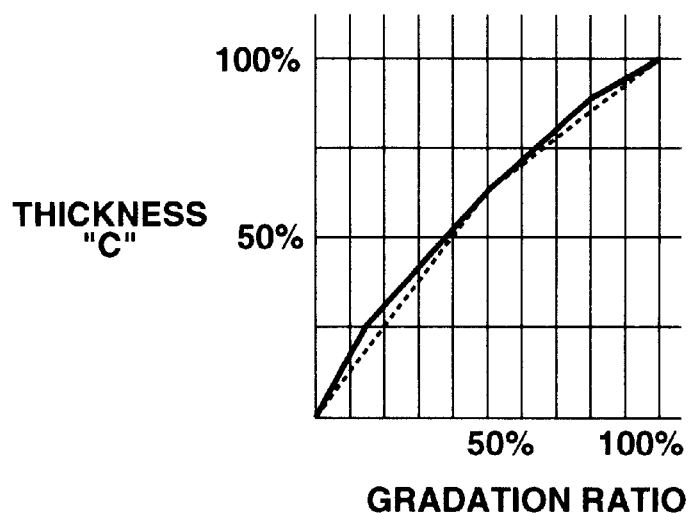
FIG. 14A is a graph showing the relationship between the tone of color (gradation ratio) of a pixel in an image to be printed and the thickness of a pixel in a printed image when printing is performed using a center-type dither pattern according to the process shown in FIG. 13.
Figure 14B:
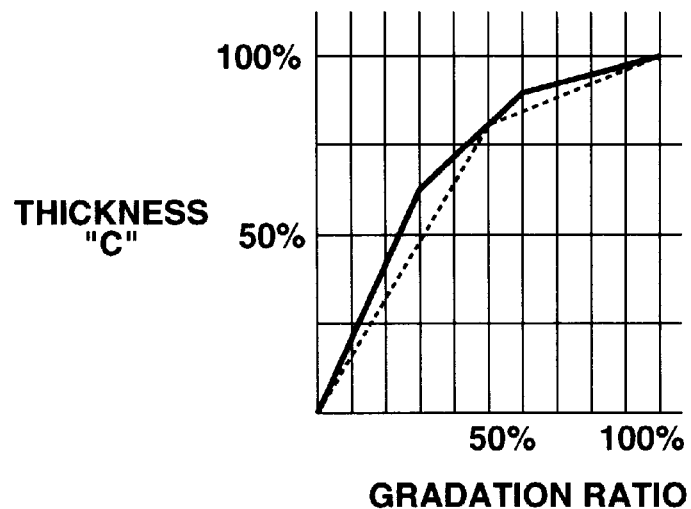
FIG. 14B is a graph showing the relationship between the tone of color (gradation ratio) of a pixel in an image to be printed and the thickness of a pixel in a printed image when printing is performed using a dispersion-type dither pattern under the condition wherein the toner blur ratio is 150%.
Figure 14C:
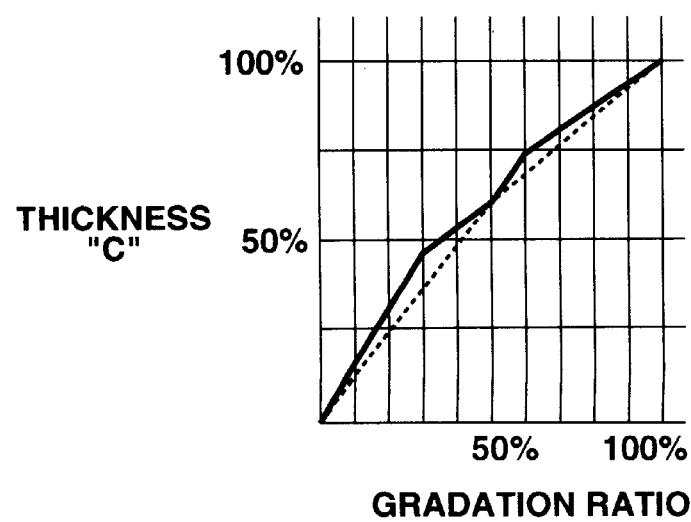
FIG. 14C is a graph showing the relationship between the tone of color (gradation ratio) of a pixel in an image to be printed and the thickness of a pixel in a printed image when printing is performed using a dispersion-type dither pattern according to the process shown in FIG. 13.

FIG. 14A exemplifies the relationship between the tone of color (expressed in the gradation ratio g/G herein) of a pixel in an image to be printed and the thickness C of a pixel in a printed image when printing is performed using a center-type dither pattern according to the above-described process. In this example, the toner blur ratio is 150%, for example, and the thickness C varies almost linearly. FIG. 14B exemplifies the relationship between the tone of color (the gradation ratio g/G) of a pixel in an image to be printed and the thickness C of a pixel in a printed image when printing is performed using a dispersion-type dither pattern under the condition wherein the toner blur ratio is 150%. In this example, the thickness C varies non-linearly before and after the point corresponding to a gradation ratio of 50%. FIG. 14C exemplifies the relationship between the tone of color (the gradation ratio g/G) of a pixel in an image to be printed and the thickness C of a pixel in a printed image when printing is performed using a dispersion-type dither pattern under the condition wherein the toner blur ratio is 130%. In this case, the thickness C varies almost linearly.

According to the color printer of the fifth embodiment, as described above, the toner blur ratio is adjusted in accordance with a difference between the dither patterns so that the gradations which most approximate to the color tone variations in an image to be printed can be attained in the image as printed, whichever type of dither pattern is employed.

Modification of the Embodiments

The present invention is not limited to the first to fifth embodiments described above, and various modifications are possible. Modifications of the embodiments of the present invention will now be described.

Explained in the above-described embodiments is the case where dithering is achieved by setting ON/OFF the dots in 1 pixel. However, the present invention is applicable also to the case where dithering is performed in consideration of circumferential dots.

The above-described embodiments are directed to color printers which print a color image on a sheet of paper by printing monochrome images in four colors of yellow (Y), magenta (M), cyan (C) and black (K) so as to be superposed on one another. However, the number of monochrome images which are superposed on one another to print a color image is arbitrary. The colors of the monochrome images superposed on one another are also not limited to four colors of yellow (Y), magenta (M), cyan (c) and black (K). The present invention is applicable also to a printer which prints an image in a single color, insofar as halftones are represented through dithering.

Explained in the above embodiments are electrophotographic printers which print a color image on a sheet of paper through the use of toners in four colors of yellow (Y), magenta (M), cyan (c) and black (K) by printing images in the individual colors so as to be superposed on one another. However, the present invention is applicable also to other types of printers like an ink-jet printer and a fusion-type thermal transfer printer.

In the above embodiments, a dithering method wherein dithering is performed through the use of mask patterns creased based on a threshold matrix is applied to the printers. However, the dithering method of the present invention is applicable also to the case where an image is output to an image outputting apparatus of another type.

What is claimed is:

1. A dithering method comprising:
   a matrix storing step of storing in a first memory a matrix of elements serving as pieces of order information for determining in sequential order whether there is any mask in each mask location in the matrix;
   a mask pattern creating step of determining whether there is any mask in each mask location in accordance with the pieces of order information in said matrix, and creating mask patterns conforming to a number of gradations in an image to be output;
   a dithering step of masking image data with the mask pattern conforming to one of said gradations which corresponds to said image data; and
   an image developing step of developing said image data masked by said dithering step in a frame memory.

2. The dithering method according to claim 1, wherein:
said dithering method further comprises a mask pattern storing step of storing the mask patterns created by said mask pattern creating step in a second memory; and
in said dithering step, of the mask patterns stored in said second memory by said mask pattern storing step, the mask pattern conforming to the gradation corresponding to said image data is used to mask said image data.

3. The dithering method according to claim 1, wherein:
said first memory comprises a nonvolatile storage medium; and
said matrix storing step comprises prestoring said matrix in said nonvolatile storage medium.

4. The dithering method according to claim 1, wherein:
said matrix includes a basic matrix having elements serving as pieces of order information and an arrangement matrix having elements serving as pieces of order information specifying an order in which the elements of said basic matrix are arranged; and
said mask pattern creating step comprises:
   (a) defining an x1 and y1 coordinate pair respectively per row and column in the basic matrix, defining an x2 and y2 coordinate pair respectively per row and column in the arrangement matrix, and sequentially and respectively changing values of x1, y1, x2 and y2 from 0 to (x'-1), from 0 to (y'-1), from 0 to (x"-1) and from 0 to (y"-1), where x', y', x" and y" represent respectively a number of the elements per column in the basic matrix, a number of the elements per column in the arrangement matrix, a number of the elements per row in the basic matrix, and a number of the elements per row in the arrangement matrix;
   (b) calculating a value of r(x1, y1)+s(x2, y2), in each process of changing the values of x1, y1, x2 and y2, where r(x1, y1) and s(x2, y2) are values which are represented by the elements serving as the order information respectively in the coordinate pairs of the basic and arrangement matrices;
   (c) substituting as order information the values calculated in the step (b) for elements each in a predetermined location of a matrix having an "n" (x'×x") number of elements in a column direction and an "m" number (y'×y") of elements in a row direction; and
   (d) using the matrix in which the order information are substituted for all of the elements in the step (c), determining whether there is any mask in each mask location in accordance with the pieces of order information in the matrix, and creating mask patterns conforming to a number of gradations in the image to be output.

5. The dithering method according to claim 1, wherein:
said dithering method further comprises: (i) a checking step of checking, in said mask pattern storing step, a storage capacity of said second memory which can store said mask patterns, and (ii) a gradation number determining step of determining the number of gradations which corresponds to the number of mask patterns said second memory can store with the storage capacity checked by said checking step; and
said mask pattern creating step comprises creating mask patterns of the number determined by said gradation number determining step.

6. A printing apparatus comprising:

a first memory for storing a matrix of elements serving as pieces of order information for determining in sequential order whether there is any mask in each mask location in the matrix;

mask pattern creating means for determining whether there is any mask in each mask location in accordance with the pieces of order information in said matrix stored in said first memory, and for creating mask patterns conforming to a number of gradations in an image to be output;

a second memory for storing the mask patterns created by said mask pattern creating means;

mask means for masking image data input from a host apparatus with the mask pattern conforming to one of said gradations which corresponds to said image data;

a frame memory in which said image data masked by said mask means is developed; and printing means for printing on a sheetlike recording medium an image represented by said image data developed in said frame memory.

7. The printing apparatus according to claim 6, wherein:

said frame memory includes a plurality of frame memories in which image data items showing different colors are developed;

said first memory stores, in association with said different colors, a plurality of matrices each having elements serving as pieces of information;

said mask pattern creating means creates a plurality of mask patterns for each of said different colors by using said plurality of matrices stored in said first memory;

said mask means masks each of said image data items developed in said plurality of frame memories with the mask patterns created for the color shown by each said image data item; and said printing means prints a plurality of images on said recording medium in a superposed manner on one another, said plurality of images corresponding to said image data items developed in said plurality of frame memories and which show said different colors.

8. The printing apparatus according to claim 6, wherein:

said matrix includes a basic matrix having elements serving as pieces of order information and an arrangement matrix having elements serving as pieces of order information specifying an order in which the elements of said basic matrix are arranged; and said mask pattern creating means comprises means for:

(a) defining an x1 and y1 coordinate pair respectively per row and column in the basic matrix, defining an x2 and y2 coordinate pair respectively per row and column in the arrangement matrix, and sequentially and respectively changing values of x1, y1, x2 and y2 from 0 to (x'-1), from 0 to (y'-1), from 0 to (x"-1) and from 0 to (y"-1), where x', y', x" and y" represent respectively a number of the elements per column in the basic matrix, a number of the elements per column in the arrangement matrix, a number of the elements per row in the basic matrix, and a number of the elements per row in the arrangement matrix;

(b) calculating a value of r(x1, y1)+s(x2, y2), in each process of changing the values of x1, y1, x2 and y2, where r(x1, y1) and s(x2, y2) are values which are represented by the elements serving as the order information respectively in the coordinate pairs of the basic and arrangement matrices;

(c) substituting as order information the values calculated in the step (b) for elements each in a predetermined location of a matrix having an "n" (x'×x") number of elements in a column direction and an "m" number (y'×y") of elements in a row direction; and (d) using the matrix in which the order information are substituted for all of the elements in the step (c), determining whether there is any mask in each mask location in accordance with the pieces of order information in the matrix, and creating mask patterns conforming to a number of gradations in the image to be output.

9. The printing apparatus according to claim 8, wherein:

said image data input from said host apparatus represent pixels, each of which corresponds to some of dots forming the output image;

said printing apparatus further comprises discriminating means for discriminating a number of dots per column and a number of dots per row, corresponding to one of said pixels;

said matrix includes a plurality of arrangement matrices respectively comprising different numbers of elements per column and row; and said mask pattern creating means selectively uses from the plurality of arrangement matrices an arrangement matrix comprising numbers of elements per column and row, said numbers being obtained by dividing the numbers of dots per column and row respectively by the numbers of element per column and row in the basic matrix.

10. The printing apparatus according to claim 6, wherein:

said printing apparatus further comprises: (i) checking means for checking a storage capacity of said second memory, and (ii) gradation number determining means for determining the number of gradations which corresponds to the number of mask patterns said second memory can store with the storage capacity checked by said checking means; and said mask pattern creating means creates mask patterns of the number determined by said gradation number determining means.

11. The printing apparatus according to claim 6, wherein said mask pattern creating means includes adjusting means for adjusting said created mask patterns so that the image which is printed on said recording medium conforms in gradation to the image to be printed.

12. The printing apparatus according to claim 11, wherein:

said first memory stores a plurality of matrices and pieces of adjustment information in association with each other, said plurality of matrices being different from each other in an arrangement of their elements, and said pieces of adjustment information being used for adjusting said mask patterns so that the image which is printed on said recording medium conforms in gradation to the image to be printed; and said adjusting means adjusts said mask patterns in accordance with said pieces of adjustment information.

13. The printing apparatus according to claim 6, wherein:

said first memory comprises a nonvolatile storage medium; and said second memory comprises a volatile storage medium.

14. The printing apparatus according to claim 6, wherein:

said first memory stores a plurality of matrices of elements serving as pieces of order information for each color of pigments in the image to be printed by said printing means;

said mask pattern creating means creates a plurality of mask patterns in accordance with matrices of element serving as the order information and respectively corresponding colors, for each color of the pigments in the image to be printed by said printing means; and said mask means masks image data corresponding to each color of the pigments in the image to be printed by said printing means, using a mask pattern conforming to a number of gradations corresponding to image data representing a corresponding color.

15. The printing apparatus according to claim 6, further comprising:

image thickness calculating means for calculating a thickness of the image to be printed on the recording medium by said printing means;

thickness range determining means for determining a range of the thickness calculated by said image thickness calculating means; and mask location number calculating means for calculating a number of mask locations using a given formula for each range of thickness determined by said thickness range determining means;

wherein said mask pattern creating means determines whether there is any mask in each mask location based on the pieces of order information in accordance with the number of mask locations calculated by said calculating means, when creating each of the plurality of mask patterns.

16. The printing apparatus according to claim 6, wherein:

said second memory is formed by said processor securing an area on a nonvolatile storage medium; and said processor checks a storage capacity of the nonvolatile storage medium which can be secured as said second memory, determines a number of mask patterns which are possibly stored for the checked storage capacity, creates the mask patterns for the determined number, and stores the created mask patterns in said second memory.

17. A printing apparatus for printing a halftone image on a sheetlike recording medium, said apparatus comprising:

an input interface for inputting print information including gradation information for printing an image on the sheetlike recording medium;

a first memory for storing a matrix of elements serving as pieces of order information for determining in sequential order whether there is any mask in each mask location in the matrix;

a second memory for storing mask patterns which are created based on the matrix;

a third memory for developing printed image data created based on the print information;

a processor which is connected to said first memory, said second memory, said third memory and said input interface via a signal line, and which creates the mask patterns to be stored in said second memory and the printed image data to be developed by said third memory; and an output interface, which is connected to said third memory via the signal line, for outputting to a printer engine the printed image data which is developed by said third memory;

wherein said processor: (i) determines whether there is any mask in each mask location in accordance with the matrix of elements serving as the pieces of order information stored in said first memory, and creates a number of mask patterns which conforms to a number of gradations in an image to be printed based on the print information input from said input interface, thereby storing the created mask patterns in said second memory, and (ii) uses, of the plurality of mask patterns stored in said second memory, a mask pattern conforming to one of gradations of image data included in the print information, creates the printed image data by masking the image data, and develops the created image data in said third memory.

18. The printing apparatus according to claim 17, wherein:

said first memory stores a plurality of matrices of elements serving as pieces of order information, for each color of pigments in the image to be printed by the printer engine;

said second memory includes a plurality of areas for storing mask patterns each corresponding to each color of the pigments in the image to be printed by the printer engine;

said third memory includes a plurality of areas for developing printed image data for each color of the pigments in the image to be printed by the printer engine; and said processor: (i) creates a plurality of mask patterns for each color of the pigments in the image to be printed by the printer engine and stores the created mask patterns in the plurality of areas of said second memory, and (ii) masks image data by using the mask patterns stored in the areas corresponding to respective colors, and creates printed image data representing corresponding colors, for each color of the pigments in the image to be printed by the printer engine, thereby developing the printed image data in each area of said third memory.

* * * * *